March 12, 1946. E. W. AUSTIN 2,396,407
PUSHER ARM REAR END MOUNTING FOR EARTH MOVERS
Original Filed Feb. 16, 1943 2 Sheets-Sheet 1
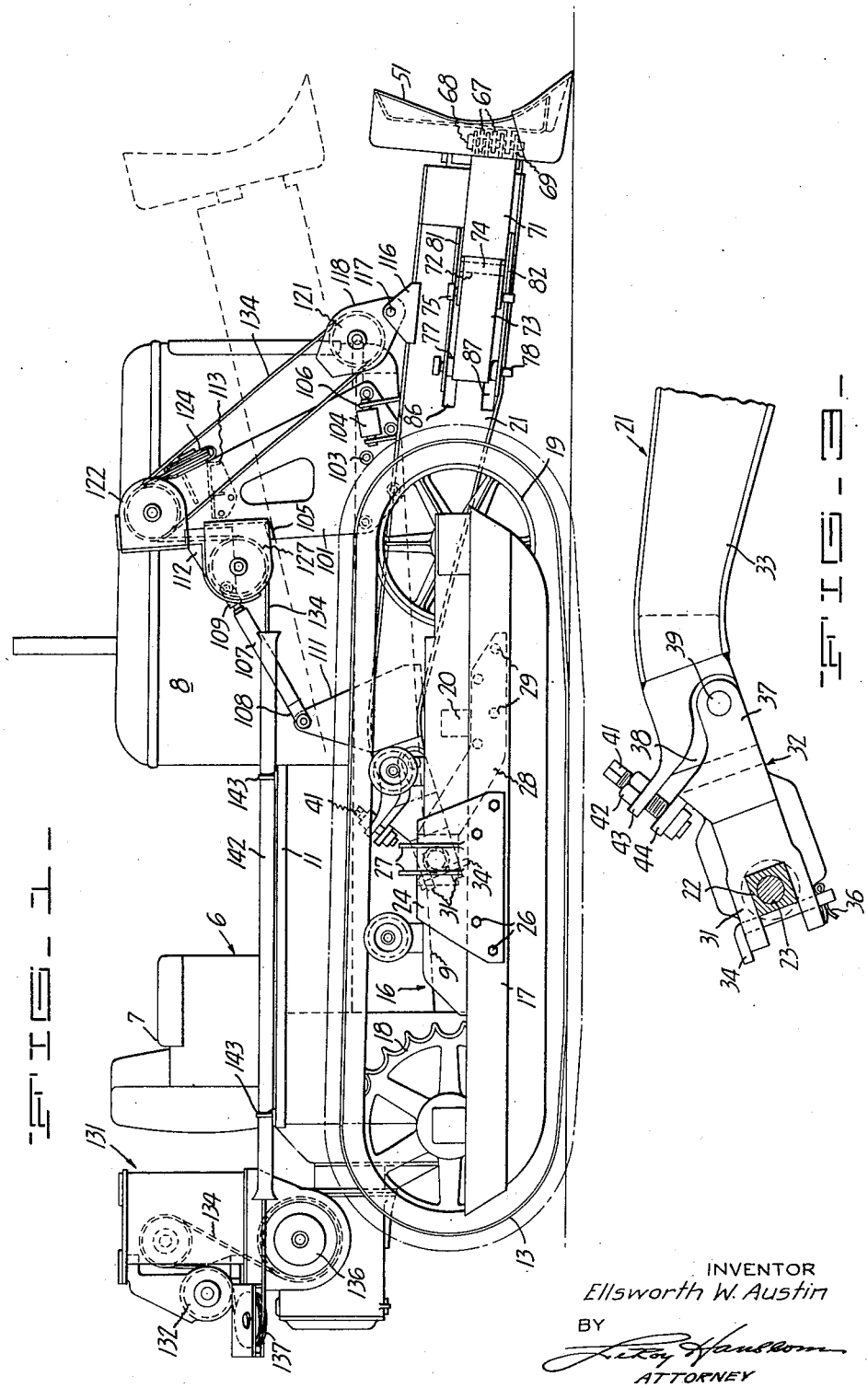
INVENTOR
Ellsworth W. Austin
BY
ATTORNEY

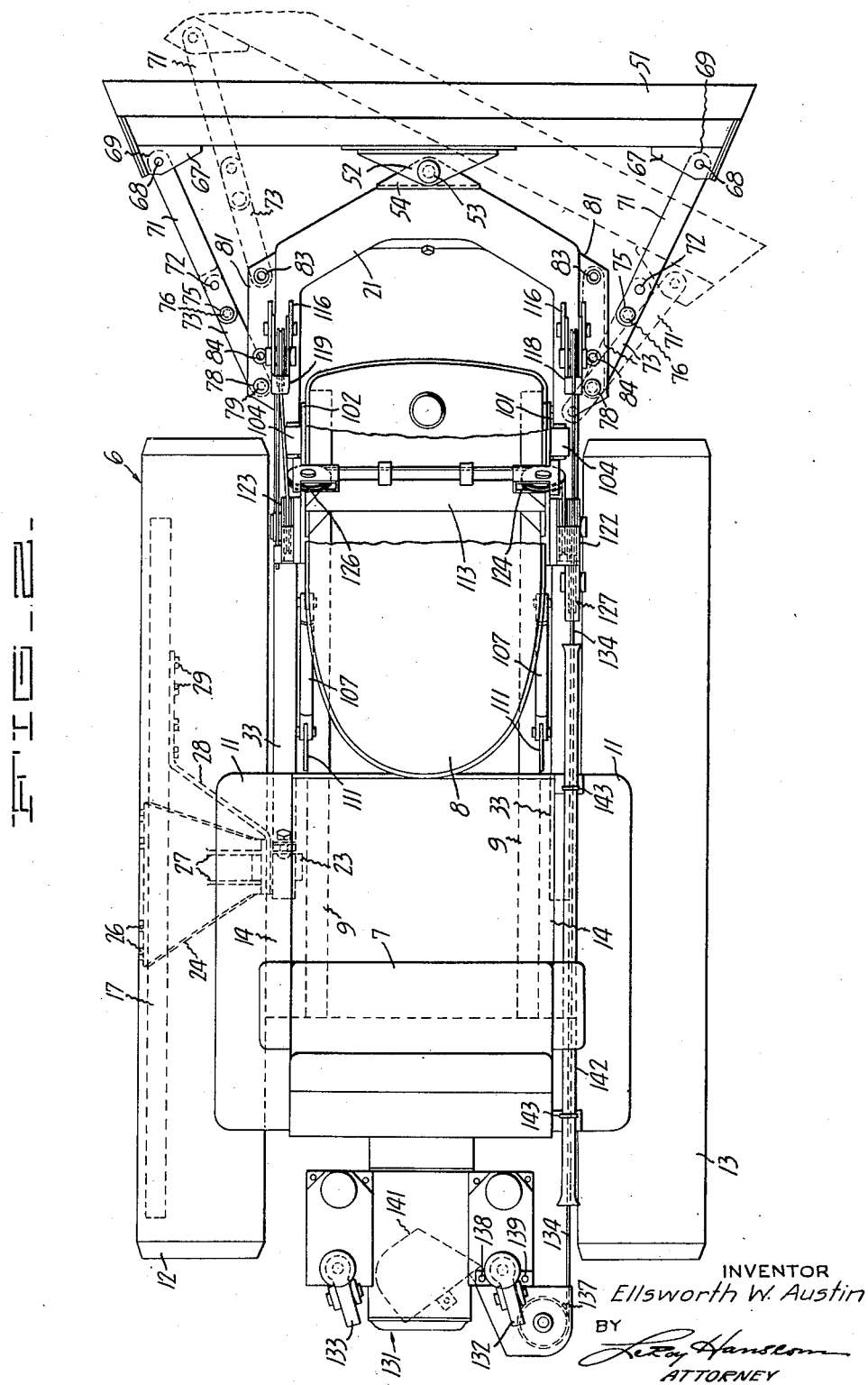

Patented Mar. 12, 1946

2,396,407

UNITED STATES PATENT OFFICE 2,396,407

PUSHER ARM REAR-END MOUNTING FOR EARTH MOVERS

Ellsworth W. Austin, Cedar Rapids, Iowa, assignor to La Plant-Choate Manufacturing Company, Incorporated, Cedar Rapids, Iowa, a corporation of Delaware Original application February 16, 1943, Serial No. 431,033. Divided and this application May 23, 1944, Serial No. 537,000

3 Claims. (Cl. 37—144)

My invention relates to earth movers of the bulldozer or trailbuilder type wherein a push frame is pivoted at its rear ends to a tractor on a substantial horizantal axis for swinging movement in front of the machine.

In general, the object of this invention is the provision in equipment of this type of a push frame rear end mounting for pivoting the rear ends of the arms of the push frame to the tractor side frames between said side frames and the tractor main frame.

The invention possesses other advantageous features, some of which with the foregoing will be set forth at length in the following description where that form of the invention which has been selected for illustration in the drawings accompanying and forming a part of the present specification is outlined in full. In said drawings, one form of the invention is shown, but it is to be understood that it is not limited to such form, since the invention as set forth in the claims may be embodied in a plurality of forms.

Fig. 1 is a side elevation of an earth mover constructed in accordance with my invention and shown as a trailbuilder mounted on a standard tractor.

Fig. 2 is a plan of the mechanism disclosed in Fig. 1, a portion of the tractor hood being broken away to disclose the interior arrangement.

Fig. 3 is a detail showing the side elevation of a portion of a push beam.

Although the invention herein claimed resides more particularly in the push frame rear end mountings, a somewhat detailed description of an earth mover embodying a mounting of this type seems desirable in order properly to orient the invention.

In its preferred form, my push frame rear end mounting is embodied as a trailbuilder or bulldozer for use with a standard tractor provided with a main frame on which there is an engine compartment and provided at its rear with a cable winch. Included in the tractor are track frames spaced from the main frame and themselves including track mechanism and track beams. Located over portions of the track frames are running boards. Trunnions are mounted in the spaces between the track frames and main frame and are supported by arched brackets secured to the outside of the adjacent track beam and are reinforced by straps also secured to the track beam. On the trunnions a push frame is journalled with at least one member of the push frame having variable pivotal arrangement with the remaining portion. Pivoted on the front end of the push frame is a push plate or blade, which can be held in any desired selected position by folding push beams or struts. An operating cable is strung from the winch around a cable wheel which is movable into a suitable supporting position or into another position out of the way and the cable is extended through a tube secured to the running board and then passes around suitably aligned sheaves mounted on a bracket disposed at one side of the engine compartment on the main frame. The operating cable then extends through the engine compartment and around comparable sheaves on a bracket secured on the other side of the main frame and aligned with sheaves on the push frame so that when the cable is operated the trailbuilder is raised and lowered.

Referring now to the drawings, the objects of my invention have been embodied in a standard tractor generally designated 6 and including the customary operator's station 7, and an engine compartment 8, both located on a central main frame 9 of the machine. On either side of the machine are running boards 11, which are fastened on the main frame and extend over the respective track frames 12 and 13 located on opposite sides of the main frame and disposed to leave an intermediate space 14 therebetween. Included in each of the track frames is a track mechanism generally designated 16 as well as an outer track beam 17 extending from the rear sprocket wheel 18 to a connection with the forward idler wheel 19. A transverse spring 20 or equalizer bar relates the forward portions of the track frames 12 and 13 with the main frame 9.

In accordance with my invention I provide a suitable mounting for an earth moving implement and this comprises a push frame 21 which is preferably symmetrical on both sides of the longitudinal center line although there can be some variation in the construction on opposite sides. The push frame is preferably mounted on the track frames 12 and 13 and for that reason I dispose in each of the spaces 14 a trunnion bearing 22. Since the opposite sides of the machine are preferably alike, a description of one applies to both. The trunnion bearing 22 is mounted preferably on a trunnion or shaft 23 which extends from a bracket 24 arched over the track mechanism 16 and being provided with fastening means 26 securing the arched bracket to the track beam 17 on the outer side thereof or on the side of the track beam away from the intermediate space 14. Reinforcing ribs 27 increase the strength of the arch bracket. As a further means of securing the trunnion 23 in position, a strap 28 is secured thereto and extends to fastening means 29 securing the forward end of the strap to the inside of the track beam 17. In this fashion a rigidly fixed trunnion 23 is afforded within the space 14.

The push frame 21 is adapted to be secured to the trunnion bearings 22 and can either be the conventional, box construction U-type or can include adjusting mechanism to compensate for variations in environment and operating conditions. For example, the grousers on the tracks 12 and 13 sometimes are slat street plates and at other times are elevated ice engaging cleats so that the height of trunnion bearings 22 from the ground surface or ice surface varies from time to time. Also it is sometimes desired to mount the push frame 21 with a permanent horizontal incline with the respect to the main frame 9 of the tractor and I consequently provide for all of these conditions. The compensating means can be included in only one of the legs of the push frame 21 or can be included in both legs. A description of one of the mechanisms applies to both, if two are utilized.

The push frame 21 is detachably connected to the trunnion bearing 22 by the provision of a bifurcated end 31 on a push frame member generally designated 32 and included with a forward push frame member 33 in the push frame. The bifurcated end 31 fits snugly around the trunnion bearing 22 which preferably is square and is removably positioned thereon by an L-shaped keeper 34 passing through suitable apertures in the bifurcated end 31 and retained in position by a cotter pin 36. The entire push frame can be removed by withdrawing the cotter pin 36 and the keeper 34. Adjacent the forward end, the push frame member 32 is provided with part of a pivot connection 37 interengaging with a mating portion of a pivot connection 38 at the rearward part of the push frame member 33. A pivot pin 39 secures these members together for pivotal movement in a vertical plane.

The relative pivotal movement between the pivoted parts of the push frame is regulated or controlled by an adjusting screw 41 (provided with a lock nut 42) which engages an ear 43 upstanding from the push frame member 33 and likewise engages another ear 44 similarly upstanding from the push frame member 32. With this mechanism one part of the push frame can be raised or lowered with respect to the other and the height of the push frame can be regulated with respect to the ground. If both sides of the push frame incorporate such adjusting mechanisms, the range of adjustment is increased.

At the forward end, the push frame 21 is designed to mount a push blade 51 which is of any convenient construction and is usually of box form made up of structural plates and shape. The center portion of the blade structure 51 is provided with a pivot bracket 52, through which a normally vertical pivot pin 53 is passed. This pin likewise is engaged by a bracket 54 mounted on the push frame 21.

Adjacent each end, the blade structure 51 is provided with a plurality of pierced lugs 67 which are designed to receive a removable fastening pin 68. Also adapted to engage the fastening pin and occupy selected ones of the positions between the lugs 67 are pierced lugs 69 at the forward extremities of a push beam 71. The front push beam member is preferably a channel or hollow box which, adjacent one end is connected by a permanently positioned pivot pin 72 with a similar channel-like rear push member 73. The structures of the push beam members 71 and 73 are such that the rear one will be received within a portion of the front during folding or articulated movement about the axis 74 of the permanent pin 72. A removable pin 75 is designed to pass through aligned apertures 76 in the trailing end of the push member 71 and likewise in the forward portion of the rear push member 73. When the pin 76 is in such position the members 71 and 73 are in alignment and are rigid, constituting then in a sense a strut although they are equally capable of resisting tension. The rearward end of the push member 73 is provided with apertured bosses 77 designed to receive a removable pin 78 having several functions. In the straight across, or bulldozing position of the blade 51, as shown in full lines in Fig. 2, the two pins 78 on opposite sides of the machine are both engaged in the rearmost one 79, of several apertures which are provided in parallel flanges 81 and 82 outstanding from the side walls of the push frame 21. With the parts arranged as shown in full lines in Figs. 1 and 2, the machine constitutes a rigid bulldozer.

In order to change the blade into an angling or trailbuilder position, both the pins 75 and 78 are withdrawn from their respective locations so that the push beams 71 and 73 are entirely free except for their relative pivotal connection and except for their pivoted connection by the pins 68. This being so, the first operation is to replace the pins 78 not in the rearmost apertures 79 in the parallel flanges 81 and 82, but rather in the foremost apertures 83 in the flanges 81 and 82. The same maneuver is performed on the opposite side of the machine. Then the push members 71 and 73 are folded with respect to each other about the axis of the permanent pin 72 until the aperture 76 in the member 73 substantially coincides with an intermediate aperture 84 in the flanges 81 and 82. To accommodate this position of the parts the push frame 21 is provided with a pair of pockets 86 and 87 to receive the ends of the forward push member 71. The pin 76 is then introduced into the aligned apertures 84 and 76 so that a rigid connection is so provided on one side of the machine. On the other side the members 71 and 73 are kept in their same alignment by the pin 75. The push beam is moved as a unit until the apertured bosses 77 and 79 align with the forward aperture 83 and the pin 78 is placed therein thereby affording a rigid mounting. With this arrangement the push beams on opposite sides of the machine are both rigidly pinned in position to hold the blade 51 in its angled location.

Although the push frame 21 can be lowered and raised in any conventional manner, and the specific mechanism for accomplishing this movement is immaterial in so far as the invention being claimed is concerned, for purposes of illustration a cable mechanism has been shown. This mechanism is substantially the same on the opposite sides of the tractor. At each side of the forward portion of the engine compartment 8, is preferably provided one of a pair of brackets 101 and 102 which, at its lower end is secured by fastenings 103 to the main frame 9. The brackets are fabricated of structural plates and serve as guides for thrust rollers 104 mounted in suitable forks 106 upstanding from the side portions of the push frame 21. On the brackets are stops 105 to limit the maximum upper movement of the push frame. The brackets are held in position on the frame by braces 107 preferably of a threaded adjustable character having clevises 108 and 109, the former of which is secured by a pin to a bracket 111 on the main frame 9 and the latter of which is secured by a pin to an extension 112 on the plate 101 or 102. In addition, the brackets 101 and 102 are cross-braced by a channel structure 113 which extends through the engine compartment 8 and on its opposite ends is connected by removable fastenings 114 to the brackets 101 and 102.

On either side of the main frame, the push frame 21 is provided with a pair of ears 116 which are connected by pins 117 to sheave blocks 118 and 119. Each block can contain a single sheave wheel 121 or a plurality thereof depending upon the desired reeving. In alignment with each of the sheave blocks 118 and 119 are stationary sheave blocks 122 and 123 located on the brackets 101 and 102 respectively. These sheave blocks are disposed so that the intervening cables are substantially tangent to the pivot center of the push frame so that, approximately, a constant moment arm is available for the effective cable force during the entire travel of the push frame, thus minimizing the bearing loads and stresses in general. Disposed substantially tangent and at right angles to the sheave blocks 122 and 123 are transfer sheaves 124 and 126, respectively, fastened on the brackets 101 and 102 and extending partially into the engine compartment 8. On the bracket 101 and substantially tangent with the sheave block 122 and approximately tangent to the running board 11 is a guide sheave 127.

Located on the main frame of the tractor at the rear of the operator's station 7 and designed to be driven by the tractor engine is a power control unit or winch 131 of a standard type. This is shown as a two drum winch having a pair of fairlead sheaves 132 and 133 thereon since such is the customary installation. But one of the drums and fairlead sheaves is utilized, however, in connection with the present mechanism. An operating cable 134 extends from the winch drum 136 and over the fairlead 132 to a cable wheel 137. This cable wheel is connected to the tractor by a pivot 138 on the winch housing and normally is held in the illustrated full line position by a movable pin 139. This installation of the cable wheel 137 can be considered permanent so far as the bulldozer and trailbuilder mechanism is concerned but occasionally the same tractor is utilized for pulling a trailing vehicle without operation of the bulldozer. In that event the cable 134 is removed from any other connection, the pin 139 is withdrawn and the cable wheel 137 is swung about the axis of the pin 138 to occupy the dotted line position 141 shown in Fig. 2 so as to be entirely out of the way of a cable extending through the fairleads 132 and 133 to a trailing structure.

In the present arrangement of the structure with the cable wheel 137 securely pinned in place, the operating cable 134 extends around the cable wheel tangentially forward to the drive sheave 127, in the meantime passing through and being guided by a tube 142 which is preferably a pipe with flared ends secured by clamps 143 to the running board 11 of the tractor. In this way the operator's safety is in no wise endangered by the proximity of the operating cable 134 and his vision is not obstructed by any elevated cable mechanism. Emerging from the tube 142 the operating cable 134 is trained around the guide sheave 127 and then passes around the sheave block 122. One or several passes are made between such sheave block and the sheave block 118 and then the cable passes from the sheave block 118 around the transfer sheave 124 and through the engine compartment 8. The cable passes in very close proximity to the channel 113 and a plurality of loops 146 are provided on the channel to confine the cable somewhat and prevent it, especially when slack, from interfering with any of the surrounding engine mechanism. Having passed through the loops 146 the cable 134 then passes around the second transfer sheave 126 and engages the sheave block 123 on the bracket 102. Then the cable is reeved around the opposite sheave block 119 on the push frame and having made the requisite number of passes between such sheave block and the sheave block 123, is suitably dead ended.

From the above disclosure, it will be appreciated that I have provided in conjunction with a tractor of the self-laying track type, a novel push frame rear end mounting for effectively pivoting the rear end of the push arms to the tractor side frames between the tractor main frame and its side frames.

This application is a division of my co-pending application, Serial No. 431,033, filed February 16, 1942, for "Earth mover."

I claim:

1. An earth mover for use with a tractor having a main frame and a track frame mounted thereon to leave an intermediate space, said track frame including track mechanism and an outer beam, comprising: a push frame trunnion disposed in said space; a bracket secured to said trunnion and to the outer face of said beam and arched over said mechanism; and a strap secured to said trunnion and secured to the inner face of said beam.

2. An earth mover for use with a tractor having a main frame and a track frame mounted thereon to leave an intermediate space, said track frame including track mechanism and an outer beam, comprising: a push frame trunnion disposed in said space; a bracket secured to said trunnion, arched over said mechanism and said beam and also secured to said beam on the side away from said trunnion; and a strap secured to said trunnion and secured to said beam on the side adjacent said trunnion.

3. An earth mover comprising: a tractor main frame; a tractor side frame on either side of said main frame, each of said side frames being spaced from said main frame and including an outer beam; a flanged bracket secured to the outer face of each of said beams with an inwardly extending portion overhanging its associated side frame; a strap secured to each of said brackets and its associated beam; a push frame trunnion secured to the inner end of each of said brackets; and push arms journalled on each of said trunnions for movement in a vertical plane between said main frame and its associated side frame.

ELLSWORTH W. AUSTIN.